US009418662B2

(12) United States Patent
Olsen (10) Patent No.: US 9,418,662 B2
(45) Date of Patent: Aug. 16, 2016

(54) METHOD, APPARATUS AND COMPUTER PROGRAM PRODUCT FOR PROVIDING COMPOUND MODELS FOR SPEECH RECOGNITION ADAPTATION

(75) Inventor: Jesper Olsen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 1237 days.

(21) Appl. No.: 12/356,814

(22) Filed: Jan. 21, 2009

(65) Prior Publication Data

US 2010/0185444 A1   Jul. 22, 2010

(51) Int. Cl.
   G10L 15/14   (2006.01)
   G10L 17/20   (2013.01)
   G10L 15/07   (2013.01)

(52) U.S. Cl.
   CPC .............. *G10L 17/20* (2013.01); *G10L 15/07* (2013.01)

(58) Field of Classification Search
   CPC ............... G10L 15/14; G10L 15/142–15/148; G10L 17/16
   USPC ............................ 704/246, 256, 256.1–256.8
   See application file for complete search history.

(56) References Cited

U.S. PATENT DOCUMENTS

| | | | | |
|---|---|---|---|---|
| 5,054,082 A | * | 10/1991 | Smith et al. | 704/275 |
| 5,165,095 A | | 11/1992 | Borcherding | |
| 5,687,287 A | * | 11/1997 | Gandhi et al. | 704/247 |
| 5,758,023 A | * | 5/1998 | Bordeaux | 704/232 |
| 5,787,394 A | | 7/1998 | Bahl et al. | |
| 5,794,198 A | * | 8/1998 | Takahashi et al. | 704/256 |
| 5,832,063 A | * | 11/1998 | Vysotsky et al. | 379/88.03 |
| 5,839,105 A | * | 11/1998 | Ostendorf et al. | 704/256 |
| 5,864,810 A | * | 1/1999 | Digalakis et al. | 704/255 |
| 5,991,364 A | * | 11/1999 | McAllister | H04M 3/42204 379/229 |
| 6,044,343 A | * | 3/2000 | Cong et al. | 704/236 |
| 6,073,096 A | * | 6/2000 | Gao et al. | 704/245 |
| 6,088,669 A | * | 7/2000 | Maes | 704/231 |
| 6,223,155 B1 | * | 4/2001 | Bayya | 704/243 |
| 6,236,963 B1 | * | 5/2001 | Naito et al. | 704/241 |
| 6,374,221 B1 | * | 4/2002 | Haimi-Cohen | 704/256.1 |
| 6,792,083 B2 | | 9/2004 | Dams et al. | |
| 7,587,321 B2 | * | 9/2009 | Liu et al. | 704/256.3 |
| 7,590,537 B2 | | 9/2009 | Kim et al. | |

(Continued)

OTHER PUBLICATIONS

Acero, A. et al., "Speaker and Gender Normalization for Continuous-Density Hidden Markov Models", *IEEE*, 1996, pp. 342-345.

(Continued)

*Primary Examiner* — Michael N Opsasnick
(74) *Attorney, Agent, or Firm* — Alston & Bird LP (57) ABSTRACT

An apparatus for providing compound models for speech recognition adaptation. The apparatus may include processor and memory including computer program code with the memory, the computer program code being configured, with the processor, to cause the apparatus to at least receive a speech signal corresponding to a particular speaker. The apparatus may further be configured to select a cluster model including both a speaker independent portion and a speaker dependent portion based at least in part on a characteristic of speech of the particular speaker. The apparatus may be further configured to process the speech using the selected cluster model. The apparatus may be further configured to cause at least a speaker dependent portion of one or more non-selected cluster models to be stored remotely. A corresponding method and computer program product are also provided.

17 Claims, 4 Drawing Sheets

(56) References Cited

U.S. PATENT DOCUMENTS

| | | | |
|---|---|---|---|
| 8,719,023 B2* | 5/2014 | Menendez-Pidal et al. | 704/256.1 |
| 2002/0103639 A1* | 8/2002 | Chang | G10L 15/30 704/223 |
| 2003/0046068 A1 | 3/2003 | Perronnin et al. | |
| 2004/0162728 A1 | 8/2004 | Thomson et al. | |
| 2005/0182626 A1 | 8/2005 | Kim et al. | |
| 2005/0228666 A1* | 10/2005 | Liu et al. | 704/256 |
| 2006/0074657 A1 | 4/2006 | Huang | |
| 2006/0292265 A1* | 12/2006 | Petermann | A23C 9/133 426/34 |
| 2009/0119103 A1* | 5/2009 | Gerl | G10L 17/04 704/243 |

OTHER PUBLICATIONS

Gales, M.J.F., "Maximum Likelihood Linear Transformations for HMM-Based Speech Recognition", *Computer Speech and Language*, vol. 12, pp. 1-18.

International Search Report and Written Opinion from corresponding International Appl. No. PCT/IB2010/000106, mailed Apr. 14, 2010.

Bocchieri, E., et al.; "Subspace Distribution Clustering Hidden Markov Model;" IEEE Transactions on Speech and Audio Processing; vol. 9, No. 3; pp. 264-275; dated Mar. 2001; retrieved on Dec. 12, 2012 from < http://www.cs.ust.hk/~mak/PDF/sap2001-sdchmm-debut.pdf>.

Supplementary European Search Report for Application No. EP 10 73 3288 dated Jul. 30, 2014.

Padmanabhan, M. et al., *Speaker Clustering and Transformation for Speaker Adaptation in Speech Recognition Systems*, IEEE Transactions on Speech and Audio Processing, vol. 6, No. 1 (Jan. 1998) pp. 71-77.

Young, S. et al., "The HTK Book;" <http://htk.eng.cam.ac.uk/docs/docs.shtml>; retrieved on Dec. 12, 2012 from < http://www.google.com/url?url=http://scholar.google.com/scholar_url%3Fhl%3Den%26q%3Dhttp://speech.ee.ntu.edu.tw/courses/DSP2011spring/hw2/HTKBook-3.4.1.pdf%26sa%3DX%26scisig%3DAAGBfm2UFdlcQp3MwFBIUM-vdHSfPbYxPQ%26oi%3Dscholarr&rct=j&sa=X&ei=P8TIUJetE7TO0QHP3oDQCw&ved=0CC0QgAMoADAA&q=The+HTK+Book&usg=AFQjCNE2EcJ-4xFmxLHxpJda8uh-BvG63Q> (dated Apr. 2005).

Office Action from related Chinese Patent Appl. No. 201080005155. 4, dated Feb. 13, 2014.

Office Action from Chinese Patent Application No. 201080005155.4 dated Sep. 4, 2014.

Chinese Office Action for Application No. 201080005155.4, dated Jul. 26, 2013.

\* cited by examiner

METHOD, APPARATUS AND COMPUTER PROGRAM PRODUCT FOR PROVIDING COMPOUND MODELS FOR SPEECH RECOGNITION ADAPTATION

TECHNOLOGICAL FIELD

Embodiments of the present invention relate generally to speech processing technology and, more particularly, relate to a method, apparatus, and computer program product for providing an architecture for compound models for speech recognition adaptation.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task, play a game or achieve a goal. The services may be provided from a network server or other network device, or even from the mobile terminal such as, for example, a mobile telephone, a mobile television, a mobile gaming system, etc.

In many applications, it is necessary for the user to receive audio information such as oral feedback or instructions from the network or mobile terminal or for the user to give oral instructions or feedback to the network or mobile terminal. Such applications may provide for a user interface that does not rely on substantial manual user activity. In other words, the user may interact with the application in a hands free or semi-hands free environment. An example of such an application may be paying a bill, ordering a program, requesting and receiving driving instructions, etc. Other applications may convert oral speech into text or perform some other function based on recognized speech, such as dictating a document, short message service (SMS) message or email, etc. In order to support these and other applications, speech recognition applications, applications that produce speech from text, and other speech processing devices are becoming more common.

Speech recognition, which may be referred to as automatic speech recognition (ASR), may be conducted by numerous different types of applications that may convert recognized speech into text (e.g., a speech-to-text system). Current ASR and/or speech-to-text systems are typically based on Hidden Markov Models (HMMs), which are statistical models that describe speech patterns probabilistically. In some instances it may be desirable for speech models to ignore speaker characteristics such as gender, age, accent, etc. However, in practice it is typically impractical to ignore such characteristics so speech models may model both speaker and environmental factors as well as the "pure" linguistic patterns desirable for recognition. Thus, for example, "Speaker Dependent" (SD) acoustic models that are trained for a specific speaker's voice are generally more accurate than "Speaker Independent" (SI) acoustic models which generalize over a population of different speakers. Pure SD models, however, may be inconvenient in that such models must be trained individually for each speaker. This may require that several hours worth of transcribed speech recordings be available for a given speaker.

Accordingly, there may be need to develop improved speech processing techniques that address the problems described above.

BRIEF SUMMARY

A method, apparatus and computer program product are therefore provided for providing an architecture for compound models for speech recognition adaptation. According to some exemplary embodiments of the present invention, compound models may be provided that may improve speech processing techniques. In this regard, the compound models may incorporate a clustering technique that can be employed in a manner that enables relatively fast resolution as to which clusters to apply while reducing memory usage. The clusters may include both SI and SD portions, with the SI portion being shared among a plurality of SD portions in order to reduce memory consumption. Accordingly, embodiments of the present invention may be applicable a plurality of different speakers with different accents, genders and other characteristics. As a result speech processing may be improved due to a higher quality, based on compound models that may improve both the capability and efficiency of speech processing devices.

In one exemplary embodiment, a method of providing compound models for speech recognition adaptation is provided. The method may include receiving a speech signal corresponding to a particular speaker, selecting a cluster model including both a speaker independent portion and a speaker dependent portion based at least in part on a characteristic of speech of the particular speaker, and processing the speech signal using the selected cluster model.

In another exemplary embodiment, a computer program product for providing compound models for speech recognition adaptation is provided. The computer program product may include at least one computer-readable storage medium having computer-readable program code instructions stored therein. The computer-readable program code instructions may include executable portions for receiving a speech signal corresponding to a particular speaker, selecting a cluster model including both a speaker independent portion and a speaker dependent portion based at least in part on a characteristic of speech of the particular speaker, and processing the speech signal using the selected cluster model.

In another exemplary embodiment, an apparatus for providing compound models for speech recognition adaptation is provided. The apparatus may include a processor configured to receive a speech signal corresponding to a particular speaker, select a cluster model including both a speaker independent portion and a speaker dependent portion based at least in part on a characteristic of speech of the particular speaker, and process the speech signal using the selected cluster model.

In another exemplary embodiment, an apparatus for providing compound models for speech recognition adaptation is provided. The apparatus may include means for receiving a speech signal corresponding to a particular speaker, means for selecting a cluster model including both a speaker independent portion and a speaker dependent portion based at least in part on a characteristic of speech of the particular speaker, and means for processing the speech signal using the selected cluster model.

Embodiments of the invention may provide a method, apparatus and computer program product for employment in systems where speech processing is desired. As a result, for example, mobile terminals and other electronic devices may benefit from an ability to perform speech processing via a single architecture which may be robust enough to offer speech processing for numerous speakers, without the use of separate modules and/or large and cumbersome models.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

As indicated above, using purely SD or purely SI models may introduce corresponding disadvantages. However, in between the two extremes of SD models and SI models, it may be possible to train models which each cover a smaller "cluster" of speakers. Useful clusters may include: male, female, child, regional accent, and/or the like. Clusters may also include non-speaker factors related to the acoustic environment. For example, factors related to the acoustic environment may include home, street, office, bar or other locations or even other factors that impact audio recordings such as the type of microphone or other recording equipment used in creating the audio recordings. Using several cluster specific models may increase storage requirements over using a single SD model set. Additionally, in a given situation, a user may be asked to select a specific model set to employ for recognition since it may be unknown in advance as to which cluster a given speaker belongs as it may be inconvenient or impossible to query the speaker about gender, accent, age, and/or other factors. Some embodiments of present invention may provide reductions in memory usage when using cluster models, and may enable quickly (e.g., with low computational requirement) classifying a given speaker to a specific cluster in an unsupervised manner.

Figure 1:
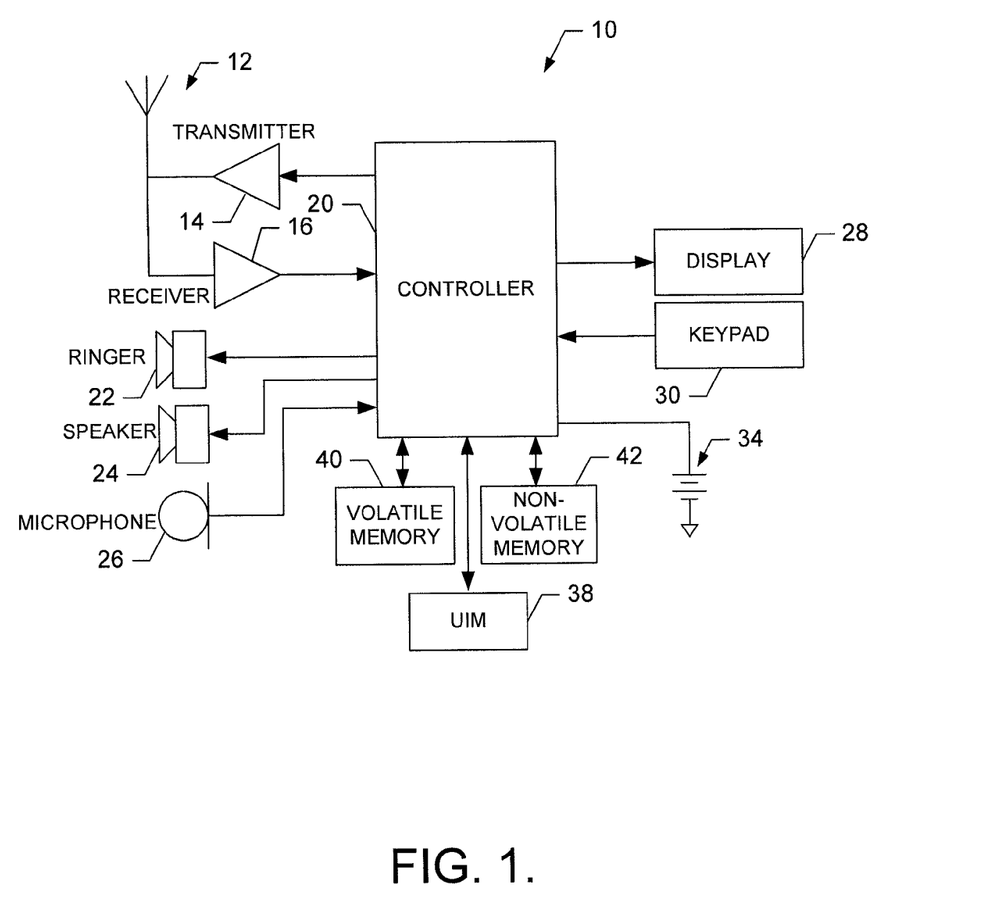
FIG. 1 is a schematic block diagram of a mobile terminal according to an exemplary embodiment of the present invention.

FIG. 1 illustrates a block diagram of a mobile terminal 10 that may benefit from embodiments of the present invention. It should be understood, however, that a mobile terminal as illustrated and hereinafter described is merely illustrative of one type of mobile terminal that may benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as mobile telephones, portable digital assistants (PDAs), pagers, mobile televisions, gaming devices, laptop computers, cameras, video recorders, audio/video players, radios, global positioning system (GPS) devices, or any combination of the aforementioned, and other types of communications systems, can readily employ embodiments of the present invention. Furthermore, devices that are not mobile may also readily employ embodiments of the present invention.

An example of a mobile device on which embodiments of the present invention may be utilized is shown in FIG. 1, which illustrates a block diagram of a mobile terminal 10 that may benefit from exemplary embodiments of the present invention. In one exemplary embodiment, the mobile terminal 10 includes an antenna 12 (or multiple antennas) in operable communication with a transmitter 14 and a receiver 16. The mobile terminal 10 may further include an apparatus, such as a controller 20 (e.g., processor 70) or other processing element, that provides signals to and receives signals from the transmitter 14 and receiver 16, respectively. The signals, in some cases, include signaling information in accordance with the air interface standard of the applicable cellular system, and/or may also include data corresponding to speech, received data and/or user generated/transmitted data. In this regard, for example, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In an exemplary embodiment, the controller 20 includes circuitry for implementing, among others, audio/video and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 may be allocated between these devices according to their respective capabilities. The controller 20 thus may also include the functionality to encode and interleave message and data prior to modulation and transmission. The controller 20 may additionally include an internal voice coder, and may include an internal data modem. In some cases, the controller 20 further includes functionality to operate one or more software programs, which may be stored in memory. For example, the controller 20 may be capable of operating a connectivity program, such as a conventional web browser. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a microphone 26, a display 28, and a user input interface, which may be operationally coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, in some embodiments, the keypad 30 includes a QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In some embodiments, the mobile terminal 10 further includes a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. In some cases, the UIM 38 stores information elements related to a mobile subscriber. In addition to the UIM 38, the mobile terminal 10 may be equipped with memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

In an exemplary embodiment, an apparatus 50 may be provided that may be employed at devices performing exemplary embodiments of the present invention. The apparatus 50 may be embodied, for example, as any device hosting, including, controlling or otherwise comprising a speech processing unit, module or device employing an exemplary embodiment of the present invention. Thus, for example, the apparatus 50 could be the mobile terminal 10, or a portion of the mobile terminal 10 or any other device (mobile or fixed) that may employ embodiments of the present invention. However, embodiments may also be embodied on a plurality of other devices such as, for example, where instances of the apparatus 50 (or portions thereof) may be embodied on both client side and server side devices. Thus, the apparatus 50 will be described in generic terms so as to have broad application to include either client side or server side devices. As such, the apparatus 50 of FIG. 2 is merely an example and may include more, or in some cases less, than the components shown in FIG. 2.

Figure 2:
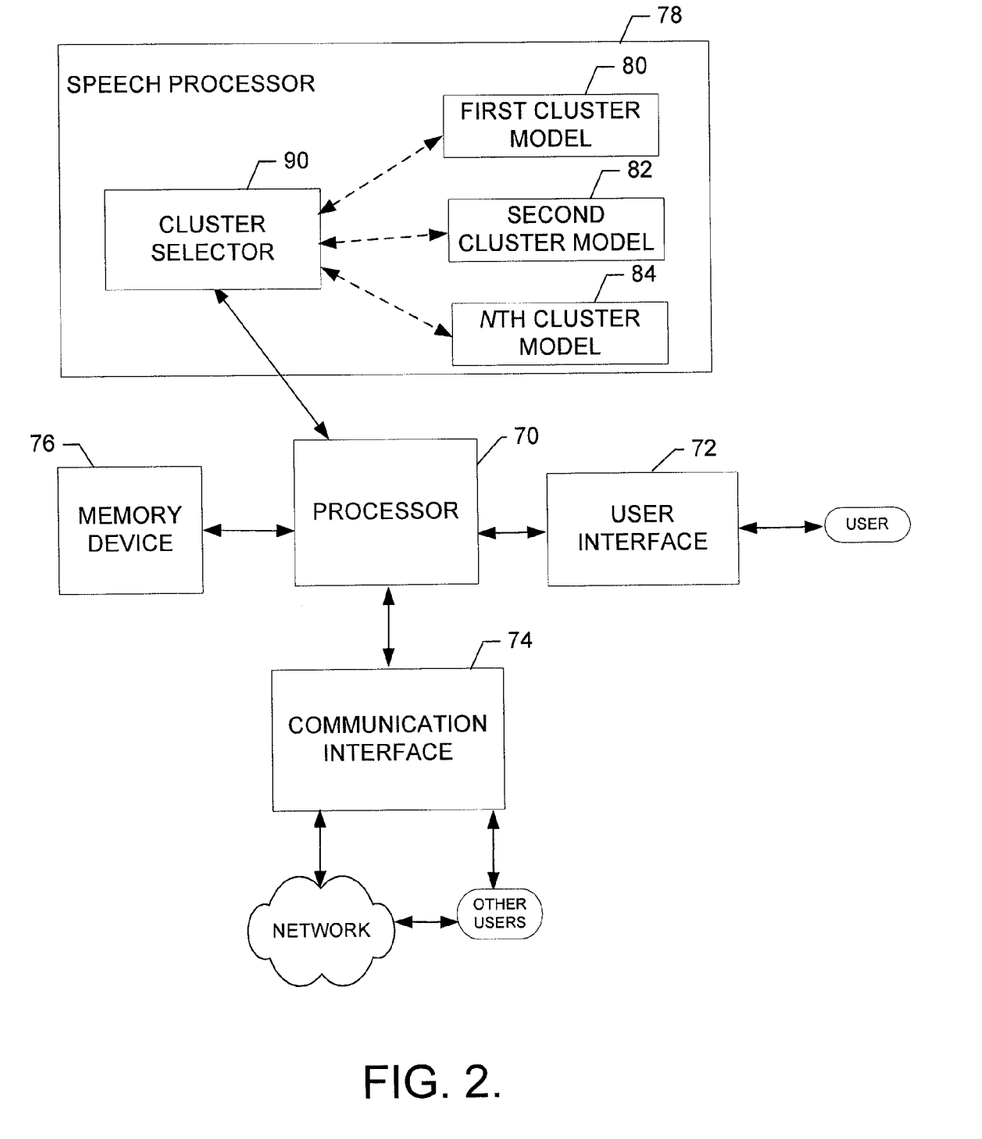
FIG. 2 is a schematic block diagram of an apparatus for providing compound models for speech recognition adaptation according to an exemplary embodiment of the present invention.

Referring now to FIG. 2, an apparatus 50 for providing an architecture for compound models for speech recognition adaptation is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases or storage locations that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element if not for the specific configuration provided by the instructions, to perform the algorithms and operations described herein. However, in some cases, the processor 70 may be a processor of a specific device (e.g., a mobile terminal) adapted for employing embodiments of the present invention by further configuration of the processor 70 by instructions for performing the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as Bluetooth, Infrared, UWB, WiFi, and/or the like.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated. In an exemplary embodiment, the user interface 72 may include or otherwise be in communication with a speech processor 78 that may be configured to receive and process speech received from the microphone or another audio reception or recording device.

Accordingly, in an exemplary embodiment, the processor 70 may be embodied as, include or otherwise control the speech processor 78. The speech processor 78, according to some embodiments, is any means such as a device or circuitry embodied in hardware, software or a combination of hardware and software that is configured to perform speech processing functions as described herein. In this regard, for example, the speech processor 78 may be any means such as a device or circuitry embodied in hardware, software or a combination of hardware and software that is configured to perform the corresponding operations of the speech processor 78 as described herein.

In an exemplary embodiment, the speech processor 78 may include a plurality of cluster models (e.g., a first cluster model 80, a second cluster model 82, and an nth cluster model 84) and a cluster selector 90. The cluster selector 90 may be any means such as a device or circuitry embodied in hardware, software or a combination of hardware and software that is configured to perform the corresponding operations of the cluster selector 90 as described herein. In this regard, for example, the cluster selector 90 may be any means such as a device or circuitry embodied in hardware, software or a combination of hardware and software that is configured to select (either automatically based on speech characteristics of input speech being processes or based on a manual input or selection from a user according to the user's assessment of the user's own speech characteristics) a corresponding one of the cluster models to be used for speech processing. Each cluster model may be associated with a corresponding speaker cluster and may be considered a "compound cluster" due to the fact that each cluster may include a speaker independent (SI) portion and a speaker dependent (SD) portion. In an exemplary embodiment, the SI portion may be shared between each (or at least a plurality) of the cluster models. However, the SD portions of each respective cluster model may be unique to the cluster of speakers represented by the corresponding cluster model (e.g., a particular gender, accent, age group and/or the like).

Some embodiments of the present invention may provide for employment of aspects of speaker adaptation, which may be viewed as an alternative to training cluster specific models, in combination with the employment of cluster specific models. In this regard, speaker adaptation may take the form of a SI model set and a SD model transform, where the size and complexity of the model transform can be varied. Some embodiments of the present invention, by virtue of utilizing a SI portion and an SD portion for each cluster model, enable the employment of speaker adapted cluster models.

HMMs can be viewed as finite-state networks. In other words, HMMs may be viewed as states connected by transitions, including self transitions from a state back to itself. A Probability Density Function (PDF) may be associated with each state. A PDF is typically implemented as a mixture of Gaussian (Normal) PDF distributions. In an exemplary embodiment, the size of an HMM model set may be controlled by using phonetic state-tying. In this regard, for example, in principle each distinct sound corresponds to a unique state or states. However, in practice many states are very similar, and hence a more compact model set can be created by re-using (or tying) states corresponding to sound units that are different in principle. In some instances, phonetic rules and statistical techniques can be used to perform the tying.

Some embodiments of the present invention assume that the state-tyings are a characteristic of each language. In other words, approximately the same tyings can be used for a particular language irrespective of the speakers of the language. As an example, if the sound /a/ in the context /tak/ is similar to the /a/ sound in the context /pak/, then this is likely to be the case for all speakers in the population even if their voices are acoustically different (e.g., male vs. female speakers). Furthermore it may be assumed that most of the non-linguistic (gender, accent, microphone, and other non-language specific) features that characterize a particular speech signal can be associated with the PDF functions associated with the corresponding states. Accordingly, embodiments of the present invention may include models (e.g., HMMs) that are divided into the SI part or portion (e.g., the state network defining states and how the states are connected or tied together (which as indicated above can be assumed to be common for all speakers of a given language)) and a SD part or portion including speaker dependent Gaussian mixture PDFs to form compound models. Each compound model may include the same shared SI part and a corresponding specific SD part. Since the SI part may be shared between all of the cluster models for a given language, the storage requirement for storing several cluster models may be reduced.

Figure 3:
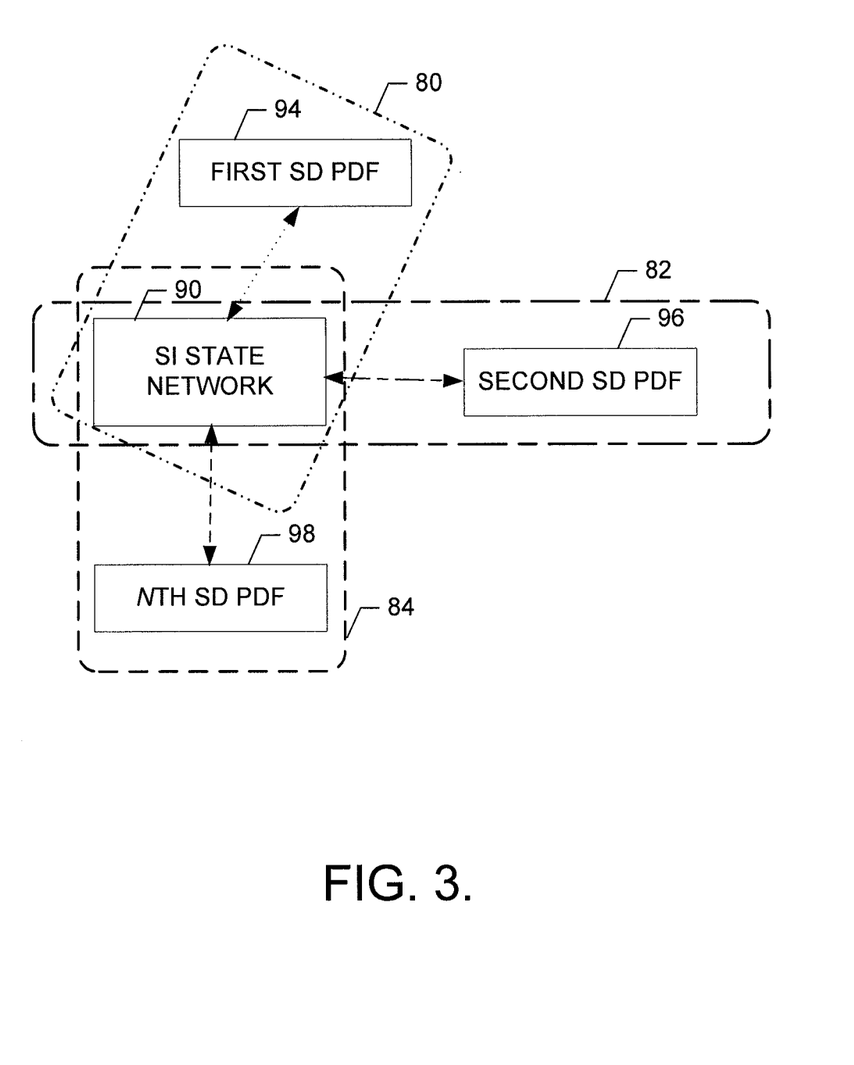
FIG. 3 illustrates a block diagram of an architecture of a compound model according to an exemplary embodiment of the present invention.

FIG. 3 shows an example architecture of cluster models for an exemplary embodiment of the present invention. In this regard, a SI state network 92 may be shared among a plurality of SD PDFs. The SI state network 92 therefore comprises the shared SI portion of the compound model. For example, a first SD PDF 94, when combined with the SI state network 92 may define the first cluster model 80 (e.g., for a particular gender, accent or age group). Meanwhile, a second SD PDF 96, when combined with the SI state network 92 may define the second cluster model 82 (e.g., for another particular gender, accent or age group different from that of the first cluster model 80).

Additionally, an nth SD PDF 98, when combined with the SI state network 92 may define the nth cluster model 84 (e.g., for a particular gender, accent or age group different from that of the first and second cluster models 80 and 82).

In an exemplary embodiment, the cluster selector 90 may be configured to select a corresponding one of the first SD PDF 94, the second SD PDF 96 or the nth SD PDF 98 to combine with the shared SI state network 92 based on the characteristics of the input speech or based on a user selection. As such, the cluster selector 90 may be configured to select an appropriate cluster model for the speech being processed. In other words, the cluster selector 90 may be configured to select a compound cluster including a speaker independent portion and a speaker dependent portion based at least in part on the characteristics of input speech relative to the speaker dependent portion.

The SD portion of a compound cluster (e.g., the SD PDFs) may be stored for each different speaker. In an exemplary embodiment, a simple array structure may be defined including SD PDFs for various speakers and a reference (or pointer) may be provided to identify the PDF array to be used for a given cluster. As such, it may be possible to change the "cluster" specific part of the model set for each respective speaker based on the reference directing the cluster selector 90 to utilize the appropriate corresponding SD PDF.

In an exemplary embodiment, HMMs used may be either conventional HMMs or subspace HMMs that use quantization to achieve both a smaller memory foot print and less processing usage than conventional HMMs. In some cases, only PDFs corresponding to one specific cluster (e.g., the cluster of the current speaker) may be utilized at any given time and thus, local memory resources (e.g., the memory device 76) may be limited to storing SD portions of compound clusters that directly correspond to the current speaker, while other SD portions may be stored on a remote server, disk, flash memory or other storage device. When another speaker is encountered, unused SD portions (e.g., PDF arrays) may be deleted from the local memory resources and SD portions corresponding to the newly encountered speaker may be imported to the local memory resources (e.g., the memory device 76).

As indicated above, in some cases the cluster selector 90 may operate by enabling the user to explicitly select one of the cluster models (e.g., via the user interface 72). However, in some embodiments it may be desirable that the cluster selector 90 select an appropriate cluster to the current speaker automatically. Automatic selection may provide convenience for the user and, in some cases, may also provide increased accuracy since the user may find it difficult to know which cluster best characterizes the user's voice.

In some examples, the cluster selector 90 may be configured to select a cluster model (or effectively select the SD portion to be used in connection with the shared SI portion) by running a recognition algorithm or operation one or more times on input speech from a particular speaker. In this regard, for example, the recognition algorithm or operation may be run once for each speaker cluster and a compound model may be selected based on the results. For example, a model providing the highest stochastic likelihood score (e.g., best match) for a given speaker after running the recognition operation a predetermined number of times may be selected as the cluster model to be used for the current speaker. However, in some cases, it may be desirable to only run the recognition operation or algorithm one time. As such, some embodiments may employ a recognition algorithm one time for each SD portion with a general SI model set (e.g., the shared SI portion such as the SI state network 92) and then rescore the 1-best recognition result with sub-cluster models. Rescoring may take a very small fraction (e.g., 1%) of the time it takes to do a full recognition.

Accordingly, the cluster selector 90 of embodiments of the present invention may be configured to select a cluster model by selecting an SD portion based at least in part on speaker characteristics for inclusion with a SI portion that is shared between all cluster models (for a given language). The selected cluster model may thereafter be employed for improved speech processing or recognition for use in a speech-to-text or other application. As an example, a gender dependent model may include the shared SI portion and a specific SD portion for the corresponding gender. Similar SD portions may exist for other speaker specific categories and a corresponding SD portion may be combined with the shared SI portion that may employ a shared HMM system that uses the same state tyings regardless of speaker.

Embodiments of the present invention may be implemented in numerous speech recognition contexts. As an example, a dictation engine (e.g., for use in document, email or SMS generation) or numerous other speech ASR applications may employ embodiments of the present invention in connection with subspace HMMs or other HMM modules. Storing cluster models including a shared component (e.g., the SI state network 92) may provide improved accuracy and performance while saving on memory consumption relative to models that are completely speaker dependent.

Figure 4:
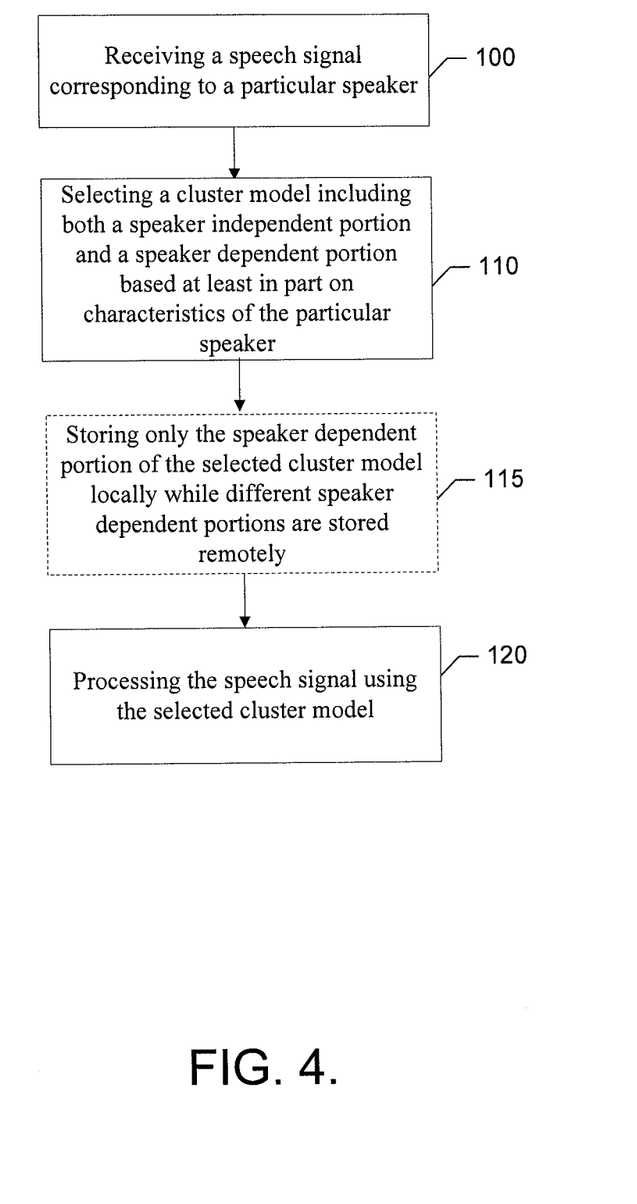
FIG. 4 is a block diagram according to an exemplary method for providing compound models for speech recognition adaptation according to an exemplary embodiment of the present invention.

FIG. 4 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., the processor 70). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). In some embodiments, the computer program instructions are stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

According to some embodiments, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing compound models for speech recognition adaptation as provided in FIG. 4 may include receiving a speech signal corresponding to a particular speaker at operation 100. The method may further include selecting (e.g., via processor 70) a cluster model including both a speaker independent portion and a speaker dependent portion based at least in part on a characteristic of speech of the particular speaker at operation 110 and processing the speech signal using the selected cluster model at operation 120.

In some embodiments, the method may include further optional operations, an example of which is shown in dashed lines in FIG. 4. Optional operations may be performed in any order and/or in combination with each other in various alternative embodiments. As such, for example, the method may further include storing only the speaker dependent portion of the selected cluster model locally and storing different speaker dependent portions remotely at operation 115.

In some embodiments, certain ones of the operations above may be modified or further amplified as described below. It should be appreciated that each of the modifications or amplifications below may be included with the operations above either alone or in combination with any others among the features described herein. In this regard, for example, selecting the cluster model may include performing a recognition operation with respect to the particular speaker for each of a plurality of cluster models and selecting one of the cluster models based on a likelihood score for the selected cluster model indicative of a degree of matching between the particular speaker and the selected cluster model. Additionally or alternatively, selecting the cluster model may include selecting the speaker dependent portion among a plurality of different speaker dependent portions in which each speaker dependent portion is associated with a corresponding speaker characteristic based on a comparison of the corresponding speaker characteristic of each speaker dependent portion to the characteristic of speech of the particular speaker. In such situations, selecting the cluster model may include forming a compound cluster model by utilizing the selected speaker dependent portion and a speaker independent state network defining the speaker independent portion that is shared among a plurality of speaker dependent portions. In some cases, selecting the cluster model may include selecting the speaker dependent portion of the cluster model based on speaker characteristics indicative of gender, accent, age or language.

In an exemplary embodiment, an apparatus for performing the method of FIG. 4 above may comprise a processor (e.g., the processor 70) configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the processor 70, the speech processor 78, the cluster selector 90 and/or an algorithm executed by the processor 70 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving, via a microphone, a speech signal corresponding to a particular speaker;
    selecting, via a processor, a cluster model to be stored in at least one memory device, the cluster model comprises both a speaker independent portion that defines a plurality of states and a plurality of state tyings and a speaker dependent portion, wherein the speaker independent portion is selected based at least in part on a recognition result of a recognition operation and wherein the speaker dependent portion is a subspace Hidden Markov Model, wherein the subspace Hidden Markov Model is selected based at least in part on a characteristic of speech of the particular speaker, the microphone, and on a rescoring of the recognition result;
    storing the speaker dependent portion of the selected cluster model locally and storing different speaker dependent portions remotely; and
    processing the speech signal, using the selected cluster model, to convert the speech signal into text.

2. The method of claim 1, wherein selecting the cluster model comprises performing a recognition operation with respect to the particular speaker for each of a plurality of cluster models and selecting one of the cluster models based on a likelihood score for the selected cluster model indicative of a degree of matching between the particular speaker and the selected cluster model.

3. The method of claim 1, wherein selecting the cluster model comprises selecting the speaker dependent portion among a plurality of different speaker dependent portions in which each speaker dependent portion is associated with a corresponding speaker characteristic based on a comparison of the corresponding speaker characteristic of each speaker dependent portion to the characteristic of speech of the particular speaker.

4. The method of claim 3, wherein selecting the cluster model comprises forming a compound cluster model by utilizing the selected speaker dependent portion and a speaker independent state network defining the speaker independent portion that is shared among a plurality of speaker dependent portions.

5. The method of claim 1, wherein selecting the cluster model comprises selecting the speaker dependent portion of the cluster model based on speaker characteristics indicative of gender, accent, age or language.

6. A computer program product comprising at least one computer-readable non-transitory storage medium having computer-executable program code instructions stored therein, the computer-executable program code instructions comprising:

program code instructions for receiving, via a microphone, a speech signal corresponding to a particular speaker;

program code instructions for selecting a cluster model to be stored in at least one memory device, the cluster model comprises both a speaker independent portion that defines a plurality of states and a plurality of state tyings and a speaker dependent portion, wherein the speaker independent portion is selected based at least in part on a recognition result of a recognition operation and wherein the speaker dependent portion is a subspace Hidden Markov Model, wherein the subspace Hidden Markov Model is selected based at least in part on a characteristic of speech of the particular speaker, the microphone, and on a rescoring of the recognition result;

program code instructions for storing the speaker dependent portion of the selected cluster model locally and storing different speaker dependent portions remotely; and program code instructions for processing the speech signal using the selected cluster model, to convert the speech signal into text.

7. The computer program product of claim 6, wherein program code instructions for selecting the cluster model include instructions for performing a recognition operation with respect to the particular speaker for each of a plurality of cluster models and selecting one of the cluster models based on a likelihood score for the selected cluster model indicative of a degree of matching between the particular speaker and the selected cluster model.

8. The computer program product of claim 6, wherein program code instructions for selecting the cluster model include instructions for selecting the speaker dependent portion among a plurality of different speaker dependent portions in which each speaker dependent portion is associated with a corresponding speaker characteristic based on a comparison of the corresponding speaker characteristic of each speaker dependent portion to the characteristic of speech of the particular speaker.

9. The computer program product of claim 8, wherein program code instructions for selecting the cluster model include instructions for forming a compound cluster model by utilizing the selected speaker dependent portion and a speaker independent state network defining the speaker independent portion that is shared among a plurality of speaker dependent portions.

10. The computer program product of claim 6, wherein program code instructions for selecting the cluster model include instructions for selecting the speaker dependent portion of the cluster model based on speaker characteristics indicative of gender, accent, age or language.

11. An apparatus comprising:

a processor; and a memory including computer program code, the memory and the computer program code configured to, with the processor, cause the apparatus to at least:

receive, via a microphone, a speech signal corresponding to a particular speaker;

select a cluster model to be stored in the memory, the cluster model comprises both a speaker independent portion that defines a plurality of states and a plurality of state tyings and a speaker dependent portion, wherein the speaker independent portion is selected based at least in part on a recognition result of a recognition operation and wherein the speaker dependent portion is a subspace Hidden Markov Model, wherein the subspace Hidden Markov Model is selected based at least in part on a characteristic of speech of the particular speaker, the microphone, and on a rescoring of the recognition result;

store the speaker dependent portion of the selected cluster model locally and storing different speaker dependent portions remotely; and process the speech signal using the selected cluster model, to convert the speech signal into text.

12. The apparatus of claim 11, wherein the memory including the computer program code is further configured to, with the processor, cause the apparatus to select the cluster model by performing a recognition operation with respect to the particular speaker for each of a plurality of cluster models and selecting one of the cluster models based on a likelihood score for the selected cluster model indicative of a degree of matching between the particular speaker and the selected cluster model.

13. The apparatus of claim 11, wherein the memory including the computer program code is further configured to, with the processor, cause the apparatus to select the cluster model by selecting the speaker dependent portion among a plurality of different speaker dependent portions in which each speaker dependent portion is associated with a corresponding speaker characteristic based on a comparison of the corresponding speaker characteristic of each speaker dependent portion to the characteristic of speech of the particular speaker.

14. The apparatus of claim 13, wherein the memory including the computer program code is further configured to, with the processor, cause the apparatus to select the cluster model by forming a compound cluster model by utilizing the selected speaker dependent portion and a speaker independent state network defining the speaker independent portion that is shared among a plurality of speaker dependent portions.

15. The apparatus of claim 11, wherein the memory including the computer program code is further configured to, with the processor, cause the apparatus to select the cluster model by selecting the speaker dependent portion of the cluster model based on speaker characteristics indicative of gender, accent, age or language.

16. The apparatus of claim 11, wherein the speaker dependent portion comprises a speaker dependent probability density function.

17. An apparatus comprising:

Means, including a microphone, for receiving a speech signal corresponding to a particular speaker;

means for selecting a cluster model to be stored in at least one memory device, the cluster model comprises both a speaker independent portion that defines a plurality of states and a plurality of state tyings and a speaker dependent portion, wherein the speaker independent portion is selected based at least in part on a recognition result of a recognition operation and wherein the speaker dependent portion is a subspace Hidden Markov Model, wherein the subspace Hidden Markov Model is selected based at least in part on a characteristic of speech of the particular speaker, the microphone, and on a rescoring of the recognition result;

means for storing the speaker dependent portion of the selected cluster model locally and storing different speaker dependent portions remotely; and means for processing the speech signal using the selected cluster model, to convert the speech signal into text.

* * * * *